United States Patent
Hartig et al.

(10) Patent No.: US 7,425,023 B2
(45) Date of Patent: Sep. 16, 2008

(54) PROFILED CLAMP

(75) Inventors: Günther Hartig, Berkshire (GB); Steve Williams, Oxon (GB)

(73) Assignee: NORMA Germany GmbH, Maintal (DE)

( * ) Notice: Subject to any disclaimer, the term of this patent is extended or adjusted under 35 U.S.C. 154(b) by 49 days.

(21) Appl. No.: 11/251,053

(22) Filed: Oct. 14, 2005

(65) Prior Publication Data

US 2006/0082155 A1    Apr. 20, 2006

(30) Foreign Application Priority Data

Oct. 15, 2004    (DE)    .................. 10 2004 050 300

(51) Int. Cl.
*F16L 19/00*    (2006.01)
*F16L 21/02*    (2006.01)
*F16L 23/00*    (2006.01)

(52) U.S. Cl. ............... 285/367; 285/365; 285/406; 285/408; 285/411; 24/279

(58) Field of Classification Search .............. 285/406, 285/407, 408, 410, 411, 365, 366, 367; 24/279, 24/280, 282, 284
See application file for complete search history.

(56) References Cited

U.S. PATENT DOCUMENTS 2,841,420  A  *  7/1958  Woolsey et al. ............. 285/421
2,973,165  A  *  2/1961  Davidson ...................... 244/15
3,861,723  A  *  1/1975  Kunz et al. .................. 285/410
4,185,858  A  *  1/1980  Peash ........................ 285/367
5,301,986  A      4/1994  Yehezkeli

FOREIGN PATENT DOCUMENTS

DE    1 135 249    8/1962
DE    198 18 562    2/2000

OTHER PUBLICATIONS

Brochure Norma® Schellen [Clamps], May 1980, pg. 1.

* cited by examiner

*Primary Examiner*—Robert J. Sandy
*Assistant Examiner*—Jay R Ripley
(74) *Attorney, Agent, or Firm*—Friedrich Kueffner

(57) ABSTRACT

A profiled clamp with at least one profiled segment which extend successively in the circumferential direction of the clamp and are clamped by means of at least one clamping device. The profiled segments have a profile which in cross-section is essentially inversely trough-shaped or cup-shaped. When the clamp is clamped, flanges which are provided at the ends of two pipes to be connected by the clamp are pressed toward each other between diverging side walls of the profiled segments. Gaps with a bottom each are provided between adjacent profiled segments. In each gap is provided a resilient metal strip at a distance from the bottom of the gap which is greater than the thickness of the bottom of the profiled segments, wherein the metal strip extends transversely of the plane of the clamp, and wherein the metal strip is mounted through lateral arms of the metal strip at the bottom of the gap.

6 Claims, 3 Drawing Sheets

PROFILED CLAMP

BACKGROUND OF THE INVENTION

1. Field of the Invention

The present invention relates to a profiled clamp with profiled segments which extend successively in the circumferential direction of the clamp and are clamped by means of at least one clamping device. The profiled segments have a profile which in cross-section is essentially inversely trough-shaped or cup-shaped. When the clamp is clamped, flanges which are provided at the ends of two pipes to be connected by the clamp are pressed toward each other between diverging side walls of the profiled segments. Gaps with a bottom each are provided between adjacent profiled segments.

2. Description of the Related Art

When using profiled clamps of this type which are known, for example, from the brochure NORMA® Schellen [clamps], May 1980, page 1, of the assignee of record or from the German Patent specification DE 198 18 562 C1, it may occasionally happen that, before placing the profiled clamp around the flanges of the pipes, the pipes to be connected are radially offset somewhat relative to each other and the inclination of the side walls of the profiled segments is not sufficient for centering the flanges and, thus, also the pipes, in the area of the clamp.

SUMMARY OF THE INVENTION

It is the primary object of the present invention to provide a profiled clamp of the above-described type in which initially eccentrically arranged flanges are automatically centered.

In accordance with the present invention, in each gap is provided a resilient metal strip at a distance from the bottom of the gap which is greater than the thickness of the bottom of the profiled segments, wherein the metal strip extends transversely of the plane of the clamp, and wherein the metal strip is mounted through lateral arms of the metal strip at the bottom of the gap.

As a result of the configuration according to the present invention, flanges which are initially eccentrically located make contact during clamping of the profiled clamp with their circumference with at least one of the metal strips. Consequently, when the profiled clamp is clamped further, the flanges are finally pushed into a coaxial, central position. When the flanges are centered, but are not yet in tight contact with each other or with a sealing ring located between the flanges, the metal strips can bend elastically toward the bottom of the gap receiving the metal strip until the flanges are in tight contact with each other or with the sealing ring arranged between the flanges.

In accordance with a preferred feature, the arms diverge toward one of the edges of the bottom of the respective gap and loosely extend around the respective edge. During clamping of the profile clamp, the arms can also bend under the pressure of the flange and be spread apart if the bending of the strips alone is not sufficient for pressing the centered flanges tightly against each other or against the sealing ring arranged between the flanges.

In accordance with a useful feature, the above-mentioned distance in the untensioned state of the clamp is greater than two times the thickness of the bottom of the profiled segments and smaller than the radial length of the sidewalls of the profiled segments. This distance makes possible a sufficient bending of the metal strip and possibly of its arms until the flanges rest tightly against each other or against a sealing ring arranged there between.

The gaps are preferably located at essentially equal circumferential distances; at least three gaps may be provided. Consequently, even if only a small number of, for example, only three gaps and metal strips are provided, the metal strips can exert an essentially uniform pressure against the flanges over the circumference thereof in order to center the flanges.

In addition, the profiled segments may be fastened to the inner side of a flexible clamping strip which can be clamped by means of the clamping device and which forms the bottom of the gaps. The profiled segments may be of a stiffer material than the flexible clamping strip and may be capable of withstanding a higher pressure of the fluid which is conducted through the pipes and which tends to press the pipes axially apart from each other and to bend the sidewalls of the profiled segments.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
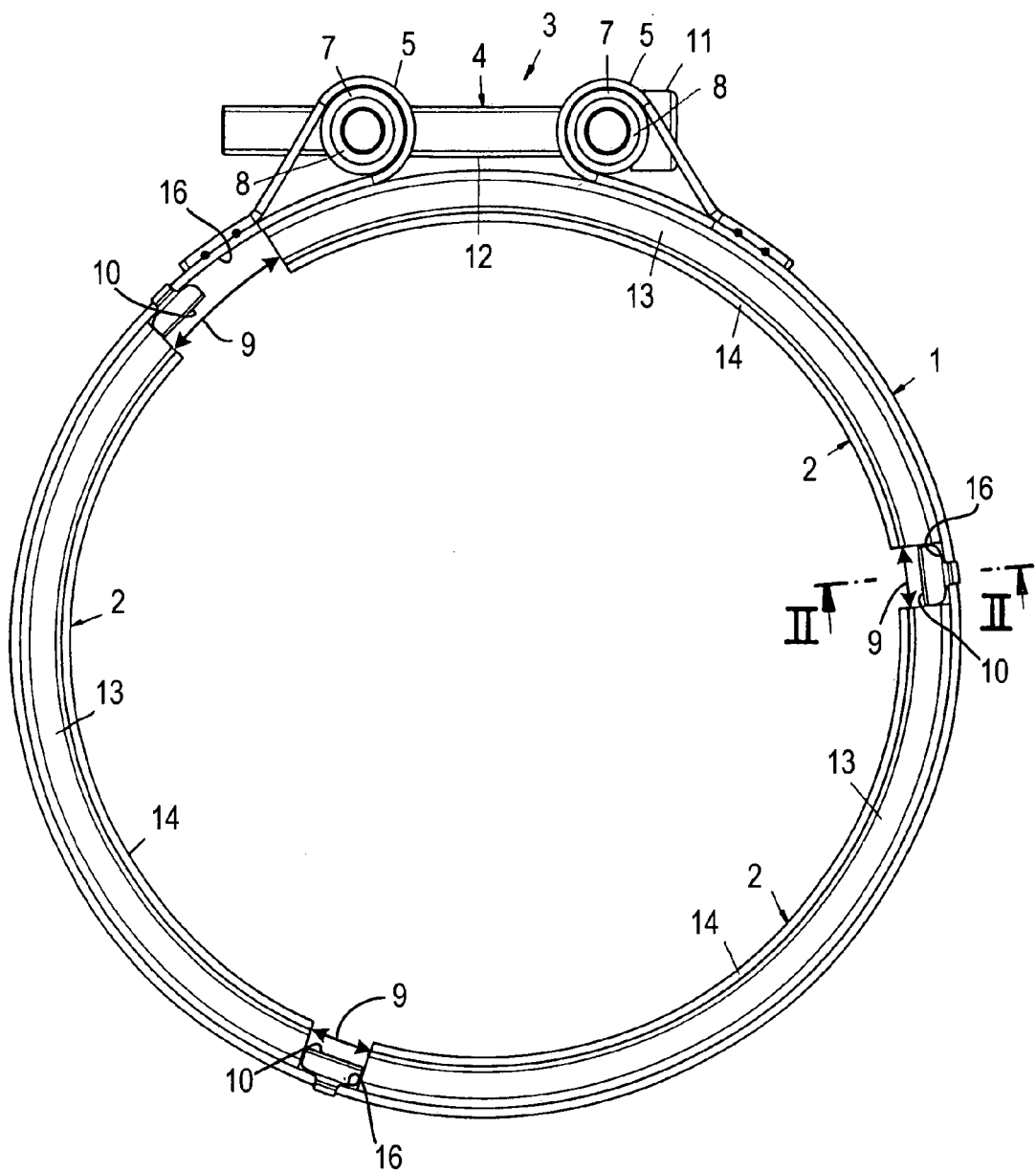
FIG. 1 is a side view of an embodiment of the profiled clamp according to the present invention.
Figure 2:
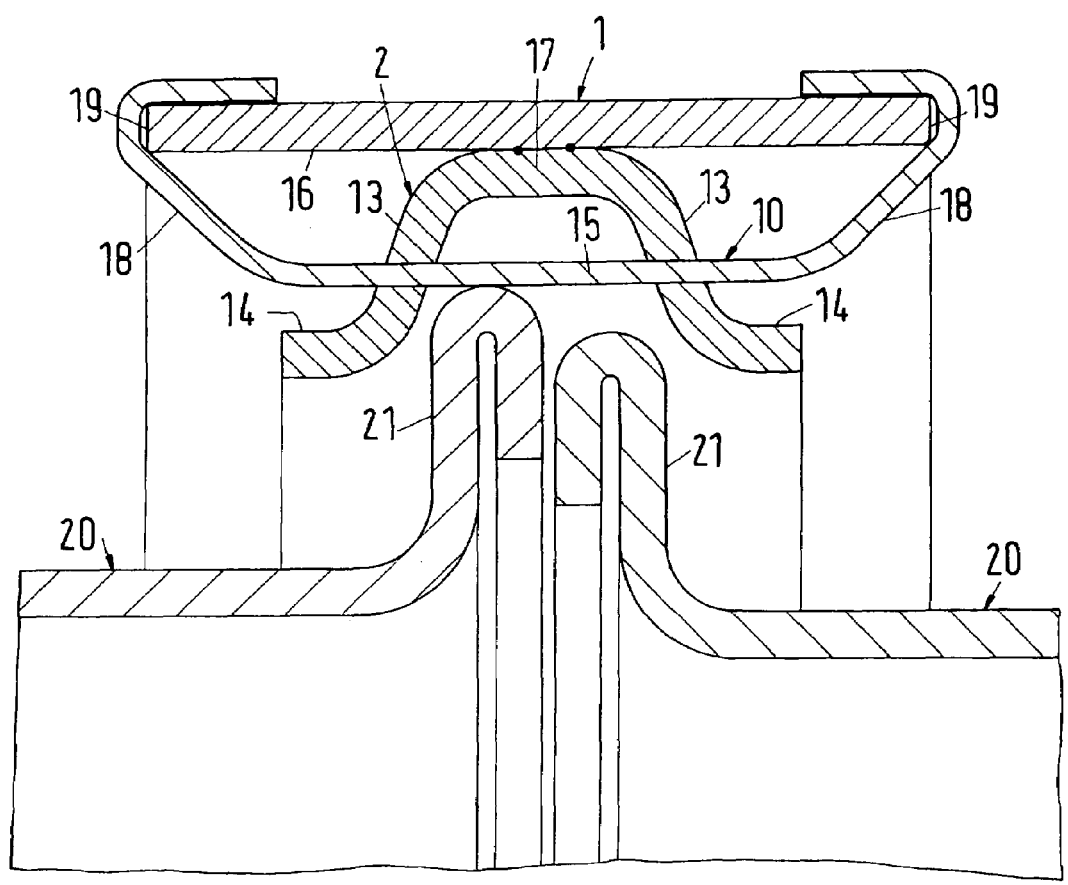
FIG. 2 is a sectional view, on a larger scale, along sectional line II-II of FIG. 1, shown prior to clamping of the profiled clamp with an initially eccentric arrangement of two pipes to be connected.
Figure 3:
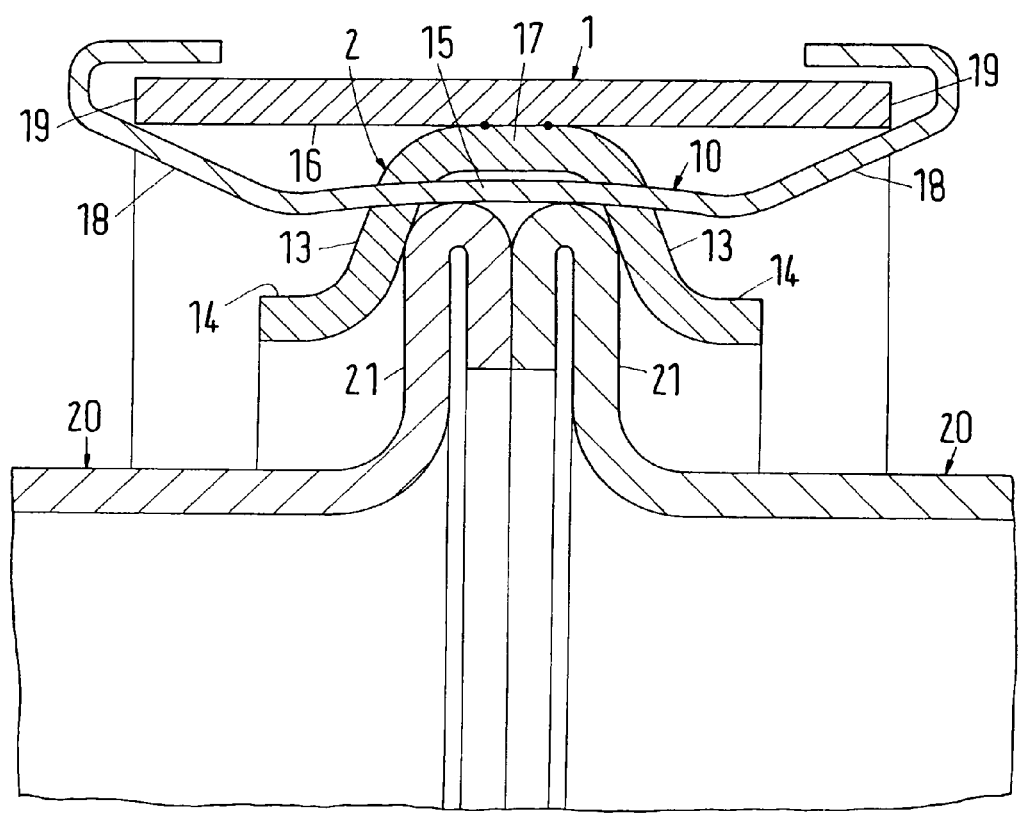
FIG. 3 is a sectional view, on a larger scale, along sectional line II-II of FIG. 1, shown in the clamped state of the profiled clamp placed around the pipes.

The profiled clamp illustrated in FIGS. 1 through 3 of the drawing is composed of a clamping strip 1 of an elastically flexible metal, three profiled segments 2 of a relatively stiff material which are fastened by dot welding, a clamping closure 3 with a tightening screw 4, joint sleeves 7 and 8 which are inserted into one another in pairs and are rotatably enclosed in loops 5 formed by end sections of the clamping strip 1, and three metal strips 10 of spring steel arranged in gaps 9 between the profiled segments 2, wherein the gaps 9 and the metal strips 10 have essentially the same circumferential spacings.

The loops 5 are welded with their ends on the outer side of the intermediate section of the clamping strip 1 by means of dot welding and are provided with slots which extend in the circumferential direction thereof, wherein the tightening screw 4 extends through the slots. The joint sleeves 7, 8 located on the sides of the head 11 of the tightening screw 4 are provided with thread-free holes for receiving the threaded shaft of the tightening screw 4 and the joint sleeves 7, 8 arranged in the other loop 5 are provided with threaded holes through which the tightening screw 4 is screwed.

The profiled segments 2 have, as seen in the cross-sectional view of FIGS. 2 and 3, a profile which is similar to an inverse trough or a hip-type roof, wherein its diverging side walls are axially bent away from each other at their radially inner edge sections 14.

In the untensioned state of the profiled clamp according to FIG. 1, each metal strip 10 has a straight middle portion 15. The portion 15 has a distance from the bottom 16 of the gap 9 formed by the clamp strip 1 which is greater than the thickness, preferably twice the thickness of the bottom 17 of the profiled segments 2 and smaller than the radial length of the side walls 13 of the profiled segments 2. The thickness of the clamp strip 1 is approximately equal to the material thickness of the profiled segments 2. The metal strips 10 extend transversely of the plane of the clamp and are mounted through lateral arms 18 at the bottom 16 of the respective gap 9. The arms 18 diverge toward one of the edges 19 of the bottom 16 of the respective gap 9 and extend around the respective edge 19 and rest on the edges 19.

The profiled clamp 1 serves for coaxially connecting two pipes 20 which are each provided with a flange 21 at the ends to be connected. The flanges 21 have the same external diameter and are bent radially initially toward the outside and then toward the inside. Prior to clamping, the profiled clamp is placed around the flanges 21. If, prior to placing the profiled clamp around the flanges 21, the pipes 20 are slightly radially offset relative to each other, as illustrated in FIG. 2, one flange 21 initially impinges with its circumference against one of the metal strips 10 and the other flange 21 impinges with its circumference against the other two metal strips 10. When the profiled clamp 20 is further clamped, the flanges 21 are radially shifted relative to each other until both flanges 21 rest against all metal strips 10. In doing so, the metal portion 15 of the metal strip 10 can bend radially outwardly, as shown in FIG. 3, while its arms 18 are further spread apart and can slide along the edges 19 because the arms extend only loosely around the edges. The flanges 21, and simultaneously also the end sections of the pipes 20 provided with the flanges 21, are centered. Moreover, the flanges 21 are tightly pressed against each other by the diverging side walls 13 of the profiled segments 2. If necessary, a sealing ring can also be arranged between the flanges 21.

The profiled clamp illustrated in the drawing may be modified, for example, by providing more than three metal strips 10 and the same number of gaps 9, for example, 4 or 5, which are distributed over the inner circumference of the profiled clamp, wherein the circumferential spacings do not have to be identical. It is sufficient if they are approximately equal. Furthermore, the metal strips 10 can also be used in profiled clamps whose profiled segments are constructed integrally in one piece with the clamp strip, as it is known, for example, from the German Patent cited above.

While specific embodiments of the invention have been shown and described in detail to illustrate the inventive principles, it will be understood that the invention may be embodied otherwise without departing from such principles.

We claim:

1. A profile clamp comprising profiled segments extending successively in a circumferential direction of the clamp and clampable by at least one clamping device, wherein the profiled segments have an essentially inverse trough-shaped profile, wherein the profiled segments each have diverging side walls for receiving therebetween flanges with equal diameters provided on ends of pipes to be connected by the clamp, wherein the flanges are pressed toward each other by the side walls when the clamp is clamped, wherein gaps having a bottom each are provided between adjacent profiled segments, further comprising resilient metal strips mounted in each gap, wherein, in an untensioned state of the clamp, each metal strip has a straight middle portion which has a distance from the bottom of the gap which is greater than two times the thickness of the bottom of the profiled segments, wherein the metal strip extends transversely of the plane of the clamp and is loosely fastened through lateral arms of the metal strip at the bottom of the gap, wherein the profiled segments are attached to the inner side of a flexible clamp strip, wherein the lateral arms end radially outside of the clamp strip and the straight middle portion is located radially inwardly of the clamp strip, and wherein the straight middle portion is bent outwardly in the tensioned state of the profiled clamp.

2. The profile clamp according to claim 1, wherein the arms diverge toward one of the edges of the bottom of the respective gap, and wherein the arms loosely extend around the edge.

3. The profile clamp according to claim 1, wherein, in the untensioned state of the clamp, the distance is greater than twice the thickness of the bottom of the profiled segments and smaller than a radial length of the sidewalls of the profiled segments.

4. The profile clamp according to claim 1, wherein the gaps are arranged at essentially equal circumferential spacings.

5. The profile clamp according to claim 1, wherein three gaps are provided.

6. The profile clamp according to claim 1, wherein the profiled segments are attached to the inner side of the flexible clamp strip which can be clamped by the clamping closure, wherein the clamp strip forms the bottom of the gaps.

* * * * *